United States Patent

Kijlstra et al.

[11] Patent Number: 5,969,002
[45] Date of Patent: Oct. 19, 1999

[54] PIGMENT PREPARATIONS FOR INKJET PRINTING

[75] Inventors: Johan Kijlstra; Stephan Kirchmeyer, both of Leverkusen; Peter-Roger Nyssen, Dormagen; Dirk Pfützenreuter, Leverkusen; Christian Wamprecht, Neuss, all of Germany

[73] Assignee: Bayer Aktiengesellschaft, Leverkusen, Germany

[21] Appl. No.: 08/922,061

[22] Filed: Sep. 2, 1997

[30] Foreign Application Priority Data

Sep. 9, 1996 [DE] Germany ............ 196 36 382

[51] Int. Cl.$^6$ ........................................ C09D 5/00
[52] U.S. Cl. ............................... 523/160; 523/161
[58] Field of Search ...................... 523/160, 161

[56] References Cited

U.S. PATENT DOCUMENTS

| | | | |
|---|---|---|---|
| 4,597,794 | 7/1986 | Ohta et al. | 106/20 |
| 5,221,334 | 6/1993 | Ma et al. | 106/200 |
| 5,330,841 | 7/1994 | Gruber et al. | 428/425.5 |
| 5,519,085 | 5/1996 | Ma et al. | 524/503 |
| 5,652,300 | 7/1997 | Morikawa et al. | 524/591 |
| 5,700,867 | 12/1997 | Ishiyama et al. | 524/539 |

FOREIGN PATENT DOCUMENTS

| | | |
|---|---|---|
| 0 517 043 A2 | 12/1992 | European Pat. Off. . |
| 0 731 148 A2 | 9/1996 | European Pat. Off. . |
| 2054 885 | 5/1972 | Germany . |
| 29 03 022 | 7/1980 | Germany . |
| 195 36 845 A1 | 4/1997 | Germany . |
| 1 358 430 | 7/1974 | United Kingdom . |
| WO 93/03070 | 2/1993 | WIPO . |

*Primary Examiner*—Edward J. Cain
*Attorney, Agent, or Firm*—Sprung Kramer Schaefer & Briscoe

[57] ABSTRACT

Pigment preparations comprising
 a) 0.1 to 70% by weight of pigment,
 b) 10 to 99% by weight of water, each based on the preparation,
 c) 0.1 to 100 % by weight, based on pigment used as component a), of a water-soluble polyisocyanate addition product, said polyisocyanate addition product having hydrophilic polyether chains and an isocyanate group content of not more than 1.0% by weight, containing 30 to 95% by weight of ethylene oxide units (molecular weight=44 g/mol) arranged within polyether chains and incorporated via monofunctional alcohols B), having an ionic group content of 0 to 200 milliequivalents/100 g of polyisocyanate addition product, and having been prepared by reaction of component A to E, the meaning of which is specified in the descriptive part, are highly useful as printing inks for inkjet printing.

7 Claims, No Drawings

PIGMENT PREPARATIONS FOR INKJET PRINTING

PIGMENT PREPARATIONS FOR INKJET PRINTING

The invention relates to pigment preparations, a process for their preparation and their use as printing inks for inkjet printing.

Pigmented inks for inkjet printing are known per se. Inkjet inks generally have pigment contents of 1 to 10% by weight, based on the ink. Important application properties required of inkjet inks include, for example, a low viscosity, a high physical stability, good drying characteristics and also a suitable surface tension. In addition, the water resistance of the resulting prints is important.

U.S. Pat. No. 4,597,794 discloses stabilizing the pigments in the printing inks with polymeric dispersants constructed of ionically hydrophilic and aromatically hydrophobic segments.

EP-A 518 225 and EP-A 556 649 describe acrylic block copolymers of the type AB, BAB and ABC for use as dispersants for pigments in printing inks.

However, known pigmented printing inks still have some application shortcomings, especially as regards their physical stability. In addition, the resulting prints still lack adequate water resistance.

It is an object of the present invention to provide pigment preparations which are free from the above disadvantages.

This object has been found to be achieved by pigment preparations comprising a) 0.1 to 70, preferably 1 to 50, especially 1 to 20, % by weight of pigment, b) 10 to 99% by weight of water, each based on the preparation, and c) 0.1 to 100, preferably 0.5 to 60, % by weight, based on pigment used as component a), of a water-soluble polyisocyanate addition product, said polyisocyanate addition product having hydrophilic polyether chains and an isocyanate group content of not more than 1.0% by weight, containing 30 to 95% by weight of ethylene oxide units (molecular weight=44 g/mol) arranged within polyether chains and incorporated via monofunctional alcohols B), having an ionic group content of 0 to 200 milliequivalents/100 g of polyisocyanate addition product, and having been prepared by reaction of A) a polyisocyanate component of an (average) NCO functionality of 1.7 to 6 and an NCO content of 5 to 65% by weight with at least one of the following components:

B) 5 to 100 equivalent %, based on the isocyanate groups of A), of a monohydric alcohol component consisting of at least one monohydric polyether alcohol of the molecular weight range 150 to 10,000, preferably 150 to 5,000, g/mol with an ethylene oxide unit content of 40 to 99.5% by weight, the polyether alcohol having been prepared by alkoxylation of a monofunctional initiator molecule, C) 0 to 20 equivalent %, based on the isocyanate groups of A), of a monofunctional component consisting of at least one compound of the molecular weight range 31 to 5,000 g/mol which has an isocyanate-reactive group and is different from the alcohols of group B), D) 0 to 50 equivalent %, based on the isocyanate groups of A), of an amino component consisting of at least one tertiary amine of the molecular weight range 88 to 250 g/mol with a group which is reactive towards isocyanate groups for the purposes of the NCO addition reaction, and E) 0 to 20 equivalent %, based on the isocyanate groups of A), of formative components of the molecular weight range 32 to 3,000 g/mol which are at least difunctional for the purposes of the NCO addition reaction, with urethane and optionally urea formation while complying with an NCO number of 100 to 600, any excess NCO groups having reacted in simultaneous or subsequent secondary reactions down to a residual content of not more than 1.0% by weight.

Pigment preparations with component c) are specified in prior application DE-A 19 508 390, unpublished at the priority date of the present invention.

Component c) of the pigment preparations of the invention acts as a dispersant and comprises reaction products of polyisocyanates A) with monohydric alcohols B) and optionally further starting components C), D) and/or E), which reaction products have been prepared with urethane and optionally urea formation and have optionally been freed from any excess isocyanate groups by means of secondary reactions taking place simultaneously with and/or subsequent to the addition reaction leading to the urethane and optionally urea formation.

Component c) contains 30 to 95, preferably 40 to 75, % by weight of ethylene oxide units (molecular weight=44) incorporated via component B). The content of free isocyanate groups is below 1% by weight. In general, no free isocyanate groups are detectable.

The component c) dispersant in the pigment preparations of the invention preferably contain 10 to 50 milliequivalents of ionic groups/100 g of component c), particularly preferably anionic groups in the form of carboxyl, sulphate, sulphonate, phosphate and phosphonate groups which are attached to the dispersant and which were converted, for example by means of alkali metal hydroxides or ethanolamine, di- or triethanolamine, into the corresponding salts.

Polyisocyanate component A) used for preparing component c) has an (average) NCO functionality of 1.7 to 6.0, preferably greater than 2.5, especially 3.0 to 6.0, and an NCO content of 5 to 65, preferably 7 to 30, % by weight. Polyisocyanate components having an (average) NCO functionality of 1.7 to 2.5 are preferably raised, during the reaction with components B to E, to a functionality of greater than 2.5, by modification reactions.

Polyisocyanate component A) consists of at least one organic polyisocyanate. Suitable polyisocyanates are unmodified polyisocyanates or modification products of conventional polyisocyanates, especially diisocyanates, which conform to the stated specifications as regards NCO content and NCO functionality.

Unmodified polyisocyanates suitable for use as component A) or as part of component A) include for example the polyisocyanates of the diphenylmethane series, as produced alongside the corresponding diisocyanates in the phosgenation of aniline/formaldehyde condensates, or else conventional higher functional polyisocyanates such as, for example, 4,4',4''-triisocyanato-triphenylmethane.

In general, however, the polyisocyanates of component A) consist of the aforementioned modification products of simple polyisocyanates. "Modification" in this context is to be understood as meaning especially the preparation of biuret, allophanate and/or isocyanurate groups. Diisocyanates to be used for preparing such derivatives include for example hexamethylene diisocyanate, cyclohexane 1,3- and 1,4-diisocyanate and also any mixtures of these isomers, 1-isocyanato-3,3,5-trimethyl-5-isocyanatomethylcyclohexane, 2,4- and 2,6-hexahydrotoluylene diisocyanate and also any mixtures of these isomers, perhydro-2,4'- and/or -4,4'-diphenylmethane diisocyanate, 2,4- and 2,6-toluylene diisocyanate and also any mixtures of these isomers, diphenylmethane 2,4'- and/or 4,4'-diisocyanate and naphthylene 1,5-diisocyanate.

For the preparation of the modified diisocyanates, particular preference is given to using the industrially important polyisocyanates, such as, for example, 2,4-diisocyanatotoluene, its technical grade mixtures with up to 35% by weight, based on mixture, of 2,6-diisocyanatotoluene, 4,4'-diisocyanatodiphenyl-methane, its technical grade mixtures with 2,4'- and 2,2'-diisocyanato-diphenylmethane, hexamethylene diisocyanate or mixtures of these diisocyanates. The polyisocyanates of component A) are very particularly preferably the isocyanurate-functional modification products of 2,4-diisocyanatotoluene or its technical grade mixtures with up to 35% by weight, based on mixture, of 2,6-diisocyanatotoluene. These particularly preferred isocyanurate-functional polyisocyanates generally have an NCO content of 7 to 30% by weight combined with an NCO functionality of 3 to 6. The polyisocyanate component A) is frequently used in the form of a solution in an inert solvent such as, for example, butyl acetate.

A preferred embodiment comprises using a component A) comprising polyisocyanates having an average functionality of 1.7 to 2.5, the modification reactions, i.e. the formation of biuret, allophanate and/or isocyanurate groups, taking place parallel with or after the reaction of components B) to E). Such modification reactions are known to the person skilled in the art and described for example in Houben-Weyl, Methoden der organischen Chemie, Volume E20, Makromolekulare Stoffe, ed. H. Bartl, J. Falbe, G. Thieme Verlag Stuttgart 1987, pages 1735, 1736 and 1739 to 1744.

The monohydric alcohol component B) consists of at least one monohydric alcohol having a molecular weight (computable from the hydroxyl group content) of 150 to 10,000, especially 150 to 5,000, preferably 500 to 3,000, g/mol, which has 40 to 99.5, preferably 70 to 99.5, % by weight, based on the total weight of the monohydric alcohol, of ethylene oxide units incorporated within a polyether chain.

A particularly suitable component B), or constituent of component B), comprises conventional alkoxylation products of monofunctional initiator molecules which, per molecule, have on average at least 3, preferably 7 to 250, alkylene oxide units which in turn comprise at least 40% by weight, preferably 70 to 100% by weight, of ethylene oxide units, based on the alkylene oxide unit.

Suitable initiator molecules for preparing the monohydric polyether alcohols include especially monofunctional alcohols, phenols or carboxylic acids. The initiator molecules generally have 1 to 30, preferably 1 to 10, particularly preferably 1 to 4, carbon atoms. Specific examples are alcohols such as methanol, ethanol, i-propanol, n-butanol, 1-pentanol, 1-hexanol, 1-octanol, oleyl alcohol or benzyl alcohol or phenols such as, for example, phenol, cresols, methylphenols, nonylphenols or dodecylphenols, or alkoxylatable acids such as, for example, acetic acid, butyric acid, capric acid, lauric acid, palmitic acid or stearic acid or else cyclohexanecarboxylic acid. Preferred initiator molecules are monohydric alcohols of the above-exemplified type with 1 to 4 carbon atoms.

The conventional alkoxylation reaction is carried out using ethylene oxide or combinations of ethylene oxide with up to 60, preferably up to 30, % by weight, based on the total amount of alkylene oxide, of other alkylene oxides such as, in particular, propylene oxide. If, as well as ethylene oxide, other alkylene oxides are used, this can be done using appropriate alkylene oxide mixtures or else by successive addition of the alkylene oxides with block formation.

Component B) is used in an amount of 5 to 100, preferably 50 to 90, equivalent %, based on the isocyanate groups of component A).

The optional component C) consists of at least one other monofunctional compound, a compound which does not conform to the observations made under B) and which has an isocyanate-reactive group. Suitable for this purpose are in particular the known monohydric alcohols such as, for example, methanol, ethanol, propanol, isopropanol, 1- and 2-butanol, isobutanol, 1-hexanol, 2-ethyl-1-hexanol, etc., also monohydric esteralcohols of the molecular weight range 94 to 350 such as, for example, methyl hydroxybutyrate, ethylene glycol monoacetate, propyl lactate or ethyl ω-hydroxycaproate or monohydric alcohols of the molecular weight range 146 to 2,000 g/mol which are obtained by conventional addition of ε-caprolactone to monohydric alcohols of the above-exemplified type.

Preference is given to compounds which bear ionic groups, such as alkali metal and ammonium salts of hydroxyacetic acid, lactic acid, glycine, taurine and N-methyltaurine.

Component C) is used in an amount of up to 20, preferably up to 10, equivalent %, based on the isocyanate groups of component A).

Component D) comprises organic compounds which, as well as at least one tert-amino group, have a group which is reactive towards isocyanate groups for the purposes of the isocyanate addition reaction, especially a hydroxyl or amino group. These compounds generally have a molecular weight of 80 to 250, especially 88 to 150, g/mol.

Examples of compounds suitable for use as component D), or as constituent of component D), are aminoalcohols such as N,N-diethylethanolamine, N,N-dimethylethanolamine, N,N-dimethylisopropanolamine, N,N-dimethyl-1,3-propanediamine, N,N-diethylethylenediamine, 2-dibutylaminoethanol, 3-(dimethylamino)-1-propanol, 1-methylpiperazine, 1-methyl-4-piperdinol, 2-morpholinoethanol, 2-piperidinoethanol, 2-piperazinoethanol, 2-piperazinoethylamine, 3-morpholinopropylamine, N,N-dibutyltrimethylenediamine, 3-(diethylamino)-1-propanol, N-methyl-3-pyrrolidinol, 2-(hydroxymethyl)-N-methylpiperidine or polyamines having at least one tert-amino group and a primary or secondary amino group. Examples of such compound s are NN-dimethyl ethyl enediamine, N,N-diethyl-1,4-butanedia ine or N-methyl-piperazine.

Preferred compounds for use as component D) or as constituent of component D) include 4-(2-hydroxyethyl) pyridine, 2-hydroxyethylmorpholine, N,N-dimethyl-11,3-propanediamine, N,N-diethyl-1,4-butanediamine and N,N-dimethylaminoethanol and N,N-dimethylaminopropylamine.

Component D) is used in an amount of from 0 to 50, preferably 10 to 50, equivalent %, based on the isocyanate group of component A). Component D) is preferably used in such an amount that the addition products which are essential to the invention contain 0 to 200, and especially 0 to 100, milliequivalents of tert-amino groups per 100 g of solids.

The optional component E) comprises organic compounds of the molecular weight range 32 to 3,000, preferably 118 to 2,000, g/mol which have two groups reactive towards isocyanate groups, these groups being two alcoholic hydroxyl groups, in particular. Examples are in particular polyester- or polyether-diols of the conventional kind within the stated molecular weight range.

Component E), if used at all, is used in the preparation of the addition compounds which are essential to the invention in an amount of up to 20, preferably up to 10, equivalent %, based on the isocyanate groups of component A). It is particularly preferable not to use component E).

Preferred pigment preparations of the invention are characterized in that the polyisocyanate addition product of component c) has been prepared with an NCO number of 100 to 130 by reaction of A) a polyisocyanate component having an average NCO functionality of 3.0 to 6 and an NCO content of 7 to 30% by weight, based on isocyanurate-functional modification products of 2,4-diisocyanatotoluene or its mixtures with up to 35% by weight, based on the mixture, of 2,6-diisocyanatotoluene, with B) 50 to 90 equivalent %, based on component A), of an alcohol component of the type mentioned under B), C) 0 to 20 equivalent %, based on isocyanate groups of A), of a monofunctional compound of the molecular weight range 30 to 5,000 g/mol which has isocyanate-reactive groups and additionally contains ionic groups, and D) 10 to 50 equivalent %, based on component A), of an amine component of the type mentioned under D)

with urethane formation and optionally simultaneous or subsequent (subsequent to the urethane formation) secondary reactions to reduce the level of any excess NCO groups present down to a residual content of not more than 1.0% by weight, the type and mixing ratios of the starting components being chosen so that the reaction product has 40 to 75% by weight of ethylene oxide units incorporated via component B).

Likewise preferred pigment preparations of the invention are characterized in that the polyisocyanate addition product of component c) has been prepared with an NCO number of 131 to 600 by reaction of A) a polyisocyanate component having an average NCO functional ity of 1.7 to 2.5 and an NCO content of 30 to 65% by weight, consisting of at least one isocyanurate from the following group: 2,4-diisocyanatotoluene, 2,6-diisocyanatotoluene, 4,4'-diisocyanatodiphenylmethane, 2,4'-diisocyanatodiphenylmethane with B) 5 to 50 equivalent %, based on component A), of an alcohol component of the type mentioned under B), C) 0 t o 10 equivalent %, based on the isocyanate groups of A), of a monofunctional compound of the molecular weight range 32 to 5,000 g/mol which has isocyanate-reactive groups and additionally contains ionic groups, and D) 0 to 20 equivalent %, based on component A), of an amine component of the type mentioned under D)

with urethane formation and optionally simultaneous or subsequent (subsequent to the urethane formation) secondary reactions to reduce the level of any excess NCO groups present down to a residual content of not more than 1.0% by weight, the type and mixing ratios of the starting components being chosen so that the reaction product has 40 to 75% by weight of ethylene oxide units incorporated via component B).

Particular preference is given to abovementioned pigment preparations of the invention which are characterized in that the polyisocyanate addition product of component c) contains 10 to 50 milliequivalents of ionic groups per 100 g of component c).

The essential addition products can be prepared from the exemplified starting materials A) to E) according to various methods. In general, the reaction takes place in the melt at temperatures of 20 to 250° C., preferably 60 to 140° C. A possible procedure comprises for example reacting the isocyanate component A) with a mixture of component B) and optionally C), D) and/or E), or else first preparing an NCO prepolymer from component A) and a portion of reactants B) to E) and then reacting it in a 2nd stage with the rest of the reactants with isocyanate-reactive groups.

Thereafter the NCO excess is reduced by secondary reactions to a residual level of not more than 1.0% by weight, preferably 0.5% by weight, particularly preferably 0% by weight. A possible example of these secondary reactions is the formation of allophanate groups, biuret groups, uretdione groups or isocyanurate groups by corresponding addition or addition-polymerization reactions of the excess NCO groups. Such reactions are frequently catalysed by the tertiary nitrogen atoms present and brought about by heating to 60 to 250° C. for 0.1 to 24 hours. Preferred secondary reactions are addition-polymerization reactions leading to the formation of uretdione groups and/or isocyanurate groups.

A particularly preferred secondary reaction is the addition polymerization of the remaining NCO groups to form isocyanurate structures which form under catalysis of tertiary nitrogen atoms optionally appearing from component D) or by addition of further trimerization catalysts.

Suitable trimerization catalysts for trimerizing the excess NCO groups in the process of the invention include all compounds hitherto used in the preparation of isocyanurate polyisocyanates. Specific examples are oxides, for example lithium oxide or bis[tributyltin] oxide; alkoxides such as, for example, sodium methoxide or potassium tert-butoxide; phenoxides, hydrides, such as, for example, sodium boranate; hydroxides, for example quaternary ammonium, phosphonium, arsonium, stibonium hydroxides or potassium hydroxide/crown ethers; amines, for example triethylamine, benzyldimethylamine, Mannich bases of phenols, pyrazines or 1-(2-hydroxyethyl)aziridine; amides, for example acrylamides and carbamnidic esters; aminimides, for example N,N-dimethyl-N-(2-hydroxypropyl)laurinimide; phosphines, for example tert-phosphines; carboxylates, for example sodium formate; potassium acetate or tetraethylammonium 2-ethylhexanoate; borates; organometallic compounds; metal chelates; acids including Lewis acids, for example hydrochloride, aluminium chloride; Friedel-Crafts catalysts or tetramethylammonium dibutyl phosphate. Good trimerization catalysts also include a number of combinations of substances which by themselves have little if any activity, for example tetramethylammonium iodide/(phenoxymethyl)oxirane, 1,4-diaza-bicyclo-[2.2.2]octane/(phenoxymethyl)oxirane or cyclohexyldimethylamine/tetramethylammonium 2-ethylhexanoate. A detailed review of catalysts for the trimerization of isocyanate groups with appropriate references to the original literature is to be found in Houben-Weyl, Methoden der organischen Chemie, Volume E, 20 (1987), pages 1741–1751, Georg Thieme Verlag Stuttgart, New York.

Although the reaction, apart from the minimal solvents optionally used for dissolving component A), is advantageously performable in the melt, it is also possible to use inert solvents, for example to reduce the viscosity. Examples of suitable solvents are dimethylformamide, N-methylpyrrolidone, dimethylacetamide, acetone, 2-butanone, ethyl acetate, butyl acetate, methoxypropyl acetate, toluene or mixtures of such solvents. In general, the solvents are removed in the course of the reaction or subsequently, for example by distillation.

Optionally it is also possible to use conventional catalysts for the isocyanate addition reaction. Specific examples are triethylamine, N,N-dimethylbenzylamine or tin compounds such as, for example, tin(II) octoate or dibutyltin dilaurate.

To introduce ionic groups into the compounds of component c), it is also possible to subject the polyaddition compounds from the reaction of components A) to E) to a further reaction.

Pigments:

"Pigments" for the purposes of the present invention are water-insoluble colorants.

The pigments used preferably have an average particle size of 0.005 to 5 µm, especially 0.005 to 1 µm. The maximum single particle size is particularly preferably below 0.5 µm, which ensures blockage-free flow through the fine nozzle holes of the printing head (generally 10 to 50 µm) and adequate physical stabilization of the pigment preparations throughout the use and storage time by the dispersant described as component c). In addition, to achieve maximum colour strength, brilliance and possibly transparency for the printed image (on films), a very fine division coupled with a narrow particle diameter distribution is advantageous.

The pigments can in principle be used in the form of their dry powders, granules or water-moist press cakes.

Suitable pigments include not only inorganic and organic colour pigments but also carbon black, of which a large number are known for example from the Colour Index, 2nd edition.

Carbon blacks to be mentioned in particular are acidic to alkaline carbon blacks from the group of the furnace or gas blacks and also chemically or physically modified or aftertreated carbon blacks.

Suitable inorganic pigments include for example zinc sulphides, ultramarine, iron oxides, cobalt blue and also chromium oxide pigments. Suitable pigments in the wider sense also include pigments in the form of finely particulate oxides such as silicon dioxide, titanium dioxide, nickel oxides, chromium antimony titanium dioxides, aluminium oxide and also finely particulate metals such as copper, iron or aluminium.

Suitable organic colour pigments include for example those of the azo, disazo, polyazo, anthraquinone, thioindigo series, also other polycyclic pigments such as, for example, from the phthalocyanine, quinacridone, dioxazine, isoindolinone, naphthalenetetracarboxylic acid and perylene and perylenetetracarboxylic acid series, also those of the perinone, indigoid, thioindigoid or diketopyrrolopyrrole series, and also metal complex pigments of azo, azomethine or methine dyes or laked dyes such as calcium, magnesium, aluminium lakes of sulpho- and/or carboxyl-containing dyes.

In addition, the pigment preparations of the invention can contain mixtures of various organic pigments or organic and inorganic pigments.

The pigment preparations of the invention can of course also contain further additives as well as components a), b) and c).

Suitable optional further additives include additives customary for inkjet printing inks.

For instance, organic solvents can be present as further component d). Of particular suitability are water-soluble organic solvents. Preference is given to those which have a solubility of greater than 0.5 g/100 g of water.

Examples of suitable organic solvents include:

aliphatic $C_1$–$C_4$-alcohols, such as methanol, ethanol, isopropanol, n-propanol, n-butanol, isobutanol or tert-butanol, aliphatic ketones, such as acetone, methyl ethyl ketone, methyl isobutyl ketone or diacetone alcohol, polyols such as ethylene glycol, propylene glycol, butylene glycol, diethylene glycol, triethylene glycol, trimethylolpropane, polyethylene glycol having an average molecular weight of 100 to 4000, preferably 400 to 1500, g/mol or glycerol, monohydroxyethers, preferably monohydroxyakl ethers, particularly preferably mono-$C_1$–$C_4$-alkyl glycol ethers such as ethylene glycol monoalkyl, monomethyl, diethylene glycol monomethyl ether or diethylene glycol monoethyl ether, diethylene glycol monobutyl ether, dipropylene glycol monoethyl ether, thioglycol, dipropiylene glycol monoethyl ether, thiodiglycol, triethylene glycol monomethyl ether or monoethyl ether, also 2-pyrrolidone, N-methyl-2-pyrrolidone, N-ethylpyrrolidone, N-vinylpyrrolidone, 1,3-dimethylimidazolidone, dimethylacetamide and also dimethylforinamide.

It is also possible to use mixtures of the solvents mentioned.

The amount of organic solvent is preferably 1 to 40, in particular 2 to 20, % by weight, based on the pigment preparations.

The amount of water and organic solvent is preferably 20 to 99% by weight, preferably 30 to 97% by weight, based on the pigment preparations.

The pigment preparations may further contain agents for setting the viscosity of the ink such as, for example, polyvinyl alcohol, polyvinylpyrrolidone, methylcellulose and other agents known to the person skilled in the art, provided they do not adversely affect the stability of the printing ink, the printing characteristics and the drying characteristics on paper.

In addition to the components mentioned, the printing ink can contain 0 to 15% by weight, preferably 0.5 to 10% by weight, based on the ink, of a surface-active agent. These can be used in principle, for example, to regulate the surface tension of the ink, also to prevent drop formation or leakage at the jet exit surface of the printing head and to adjust the wetting and drying characteristics of the ink on various types of substrates (papers). Such surface-active agents are known to the person skilled in the art in the form of commercially available products. The surface-active agent chosen must not impair the stability of the pigment preparation or the printing head materials used.

In addition, the pigment preparation of the invention can contain further ionic as well as nonionic auxiliaries. If the polyisocyanate addition product (component c) contains ionic groups, these auxiliaries should preferably be nonionic or of identical ionogeneity.

In principle, the pigment preparations can additionally contain preservatives, light stabilizers, further surfactants and optionally also pH regulators.

Examples of pH regulators are NaOH, ammonia or aminomethylprepanol, N,N-dimethylaminomethanol.

Examples of preservatives are methyl- and chloromethyl-isothiazolin-3-one, benzisothiazolin-3-one or mixtures thereof.

Examples of light stabilizers are UV absorbers.

Particular preference is given to pigment preparations comprising a) 1 to 20, especially 1 to 10, % by weight of pigment,
b) 10 to 98% by weight of water, each based on the pigment preparation,
c) 0.1 to 100, preferably 0.5 to 60, % by weight, based on pigment used as component a), of the polyisocyanate addition product as mentioned above, and
d) at least one organic solvent from the group:
aliphatic $C_1$–$C_4$-alcohols, such as methanol, ethanol, isopropanol, n-propanol, n-butanol, isobutanol or tert-butanol, aliphatic ketones, such as acetone, methyl ethyl ketone, methyl isobutyl ketone or diacetone alcohol, polyols such as ethylene glycol, propylene glycol, butylene glycol, diethylene glycol, triethylene glycol, trimethylolpropane, polyethylene glycol having an average molecular weight of 100 to 4000, preferably 400 to 1500, g/mol or glycerol, monohydroxyethers, preferably monohydroxyalkyl ethers, particularly preferably mono-$C_1$–$C_4$-alkyl glycol ethers such as ethylene glycol monoalkyl, monomethyl, diethylene glycol monomethyl ether or diethylene glycol monoethyl ether, diethylene glycol monobutyl ether, triethylene glycol monomethyl ether or monoethyl ether, also 2-pyrrolidone, N-methyl-2-pyrrolidone, N-ethylpyrrolidone, N-vinyl-pyrrolidone, 1,3-dimethylimidazolidone, dimethylacetamide and also dimethylformamide.

The preferred embodiments of the individual components conform to those specified above.

The invention further relates to the production of the novel pigment preparations for inkjet printing, which is characterized in that at least one pigment and the dispersant of component c) and optionally further additives are homogenized and wet-comminuted.

In general, the pigment, in powder form or in the form of the water-moist press cake, is beaten together with a portion of the dispersant and water, preferably deionized water, for example by means of a stirred vat, dissolver or similar machines, optionally after precomminution, to form a homogeneous millbase suspension.

The millbase suspension can additionally contain portions of low boiling solvents (boiling point <150° C.) which can be carried off, through evaporation, in the course of the subsequent fine milling. However, it can also contain portions of higher boiling solvents or further additives such as, for example, thiodiglycol or, as described above, for example milling auxiliaries, defoaming or wetting agents.

The wet comminution comprises not only the precomminution but also the fine milling. The pigment concentration of the suspension is preferably above the concentration desired for the finished pigment preparation or printing ink. The desired pigment end concentration is preferably set following the wet comminution. The precomminution is followed by milling to the desired particle fine division of from 0.001 to 5 µm, preferably 0.005 to 1 µm. Suitable apparatus for this milling includes for example kneaders, roller mills, kneading screws, ball mills, rotor-stator mills, dissolvers, corundum disc mills, vibratory mills and especially high speed, continuously or discontinuously charged stirred ball mills with grinding media having a diameter of 0.1 to 2 mm. The grinding media can be of glass, ceramic or metal, for example steel. The milling temperature is preferably within the range from 0 to 250° C., but generally at room temperature, especially below the turbidity point of the dispersants used as component c) and any surface-active agents used.

In a similarly preferred procedure, the milling can take place wholly or partly in a high pressure homogenizer or in a so-called jet disperser (known from prior, unpublished application DE-A 19 536 845), whereby the level of grinding media detritus in the suspension or the release of soluble substances from the grinding media (e.g. ions from glass media) can be reduced to a minimum or completely avoided.

In a dilution step, the resulting pigment preparation is conventionally mixed into water, optionally with the remaining dispersant quantities and optionally further additives, and homogenized and also adjusted to the desired pigment end concentration or colour strength of the preparation or printing ink. Here a portion of the dispersant can additionally be added if desired, for example to avoid a reagglomeration of fine pigment particles in the dilution.

Of particular advantage is a process for producing the pigment preparations wherein sufficient dispersant is made available in the grinding step to prepare the pigment concentrate for stabilization. Thereafter or after dilution with water, any dispersant and/or excess surface-active agent present in solution, not adsorbed on the pigment is preferably removed, and then the desired pigment preparation is standardized by addition of the remaining portions of the pigment preparation.

An example of the process for removing dispersant present in solution is centrifugation of the suspension and subsequent decanting off of the supernatant.

In addition, other additives such as, for example, polyurethane or acrylic polymers can be added to further improve the water resistance, if necessary. These can be not only of the water-soluble but also of the water-emulsifiable type, or be soluble in one of the components present in d).

In a preferred procedure, the mixing and homogenizing of the pigment preparations is effected using a jet disperser or high pressure homogenizer to prevent the formation of foam and avoid possible reagglomeration.

The standardizing of the desired pigment preparations also involves standardization to the desired viscosity, colour strength, hue, density and surface tension of the ink.

Before use of the pigment preparations as printing inks, the inks are fine-filtered if necessary, for example by means of 1 to 5 µm membrane or glass filters.

In general, the physical ink properties are adjusted for use in conventional inkjet printers, for which the surface tension should be between 20 and 70 mN/m and the viscosity should be less than 20 mPa.s, preferably 0.5 to 10 mPa.s.

When the pigment preparations of the invention are used as printing inks in inkjet printing they provide prints having excellent lightfastness and additionally have the following advantages: excellent dispersing and storage stability over a wide temperature range; good printability; high water and migration resistance of the prints on various substrates, for example on lignin-free paper, average paper quality, sized and coated paper, polymeric films, transparencies for overhead projection; they are suitable for multicolour printing, even if used together with dye inks or other pigmented inks.

In what follows, the invention is illustrated with reference to non-limiting examples.

EXAMPLE 1

Preparation of a dispersant of component c) using a diisocyanate and subsequent secondary reaction 216.43 g (0.089 hydroxyl equivalents) of polyether (initiator: butyldiglycol, 100% by weight of ethylene oxide, based on the alkylene oxide content, hydroxyl number 23 mg of KOH/g) were initially charged to a three-neck flask equipped with mechanical stirring and internal thermometer and dewatered at 120° C. and a pressure of 10 mbar in the course of 3 h. The temperature was reduced to 80° C., 33.78 g (0.388 isocyanate equivalents) of 2,4-toluylene diisocyanate were added and stirred in to a titrimetric isocyanate content of 5.4%. 3.96 g (0.044 hydroxyl equivalents) of N,N-dimethylethanolamine were added and stirred in until no isocyanate was detectable. Following addition of 380 ml of water, the mixture was cooled down to room temperature and subsequently stirred to obtain a clear solution which was used as dispersant.

EXAMPLE 2

Preparation of a dispersant of component c) using a diisocyanate and subsequent secondary reaction 162.32 g (0.067 hydroxyl equivalents) of the polyether of Example 1 and 50.0 g (0.022 hydroxyl equivalents) of a second polyether (initiator: butyldiglycol, 15% by weight of propylene oxide, 85% by weight of ethylene oxide, each based on the alkylene oxide content, hydroxyl number 25 mg of KOH/g) were initially charged to a three-neck flask equipped with mechanical stirring and an internal thermometer and dewatered at 120° C. and a pressure of 10 mbar in the course of 3 h. The temperature was reduced to 80° C., and 33.78 g (0.388 isocyanate equivalents) of 2,4-toluylene diisocyanate (Desmodur T 100®, Bayer AG) were added and stirred in to a titrimetric isocyanate content of 5.4%. 3.96 g (0.044 hydroxyl equivalents) of N,N-dimethylethanolamine were added and stirred in until no isocyanate was detectable. After addition of 375 ml of water, the mixture was cooled down to room temperature and subsequently stirred to form a clear solution which was used as dispersant.

EXAMPLE 3

Preparation of an anionically modified dispersant of component c) using a polyisocyanate 292.17 g (0.12 hydroxyl equivalents) of the polyether of Example 1 were initially charged to a three-neck flask equipped with mechanical stirring and internal thermometer and dewatered at 120° C. and a pressure of 10 bar in the course of 3 h. The temperature was reduced to 100° C., and 111.7 g (0.18 isocyanate equivalents) of a polyfunctional isocyanate (Desmodur IL®, Bayer AG, 51% in butyl acetate, functionality about 3.5, isocyanate content 15.7%, based on solids) were added and subsequently stirred in for 3 h. During this time, the solvent was distilled off at a pressure of 10 mbar. This was followed by cooling to 50° C., a mixture of 32.2 g (0.06 amine equivalents) of N-methyltaurine sodium salt (30% strength dissolved in water) and 586 g of water were added and subsequently stirred in to form a clear solution which was used as dispersant.

EXAMPLES 4 to 7

Preparation of inventive pigment preparations (parts and percentages by weight)

EXAMPLE 4

43.7 parts of deionized water were initially charged and 28.1 parts of the 40% strength aqueous solution of the polyisocyanate addition product prepared in Example 1 were completely dissolved therein at room temperature with stirring. Then 28.1 parts of the pigment grade carbon black C.I. Pigment Black 7 (Spezial Schwarz® 6, Degussa AG, Hanau) were added and homogenized by means of a dissolver. The suspension pH was then adjusted to 8.0 by means of dilute sodium hydroxide solution, and thereafter the suspension was introduced into a batchwise 1 l stirred ball mill (from Sussmeyer, Brussels). This was followed by milling with lead-free glass beads (diameter 0.3 to 0.4 mm) over a period of 3 hours with cooling.

After milling the suspension pH was 5.1. The resulting aqueous pigment concentrate was adjusted to a pigment concentration of 20% by weight with 0.1 part of a preservative (benzisothiazolin-3-one) and also deionized water.

The pigment preparation possesses excellent flowability and perfect suspension stability in 3 months' storage at room temperature and 50° C. Aqueous dilutions of these preparations down to a pigment concentration of 2% are likewise stable.

The composition can be found in Table 1.

EXAMPLE 5

Example 4 is repeated using the 40% strength aqueous solution of the polyisocyanate addition product of Example 2, affording a black pigment preparation having likewise excellent stability and flow properties.

The composition can be found in Table 1.

EXAMPLE 6

19.4 parts of deionized water were initially charged and 19.5 parts of the 40% strength aqueous solution of the polyisocyanate addition product prepared in Example 1 completely dissolved at room temperature with stirring. Then 61.0 parts of the press cake of Colour Index Pigment Red 122 with a solids content of 31.9% were added, precomminuted by means of a dissolver and homogenized. At the same time the pH of the suspension was adjusted to 8.0 by means of dilute sodium hydroxide solution. Thereafter the suspension was milled as described in Example 4.

Thereafter the millbase suspension was diluted to a pigment concentration of 5% with deionized water and centrifugated on a laboratory centrifuge (from Sigma) at a speed of 20,000/1 minute for a period of 8 hours. The substantially clear supernatant was decanted off. The resulting concentrate was adjusted with deionized water to a solids content of 20% and preservatived as described in Example 4. The pigment preparation has adequate flowability and perfect suspension stability. The composition can be found in Table 1.

EXAMPLE 7

Example 6 was repeated without the step of dilution and centrifugation and using the 40% strength aqueous solution of the polyisocyanate addition product of Example 3, affording a magenta pigment preparation having likewise excellent stability and flow properties. The composition can be found in Table 1.

TABLE 1

| Example | 4 | 5 | 6 | 7 |
| --- | --- | --- | --- | --- |
| Deionized water | 60.5 | 57.9 | 59.9 | 53.5 |
| Polyisocyanate addition product (40% strength) as per Ex. 1 | 19.7 | | 20 | |
| Polyisocyanate addition product (40% strength) as per Ex. 2 | | 21 | | |
| Polyisocyanate addition product (40% strength) as per Ex. 3 | | | | 23.2 |
| C.I. Pigment Black 7 | 19.7 | 21 | | |

TABLE 1-continued

| Example | 4 | 5 | 6 | 7 |
|---|---|---|---|---|
| C.I. Pigment Red 122 | | | 20 | 23.2 |
| Preservative | 0.1 | 0.1 | 0.1 | 0.1 |
| pH | 5.1 | 5.8 | 8 | 7.9 |
| max. particle size (μm)*] | <0.2 | <0.2 | <0.2 | <0.2 |

*) Determined from particle size distribution (weight average) Measuring apparatus: Brookhaven disc centrifuge type DCP ® 1000

APPLICATION EXAMPLES

EXAMPLES 8 to 11

The pigment preparations of Examples 4 to 7 were diluted for use as inkjet printing inks to a pigment concentration of 4% by weight in each case using deionized water and organic solvents. The composition of the pigment preparations to be used as printing inks were each chosen so that the viscosity of the printing inks is within the range from 3 to 5 mPas.

The preparation was carried out starting from the pigment preparations of Examples 4 to 7 by mixing and stirring the necessary amount of water and also other additives such as organic solvent in a glass vessel. This was followed by an ultrasonication for 1 minute and addition of preservative and optionally pH adjustment by means of dilute NaOH. The composition of the pigment preparations used as printing inks is revealed in Table 2.

These pigment preparations were filtered through a 1.2 μm filter before printing to remove any grinding media detritus and oversize from the suspension.

TABLE 2

Composition and properties of preparations used as printing inks (in % by weight, based on the preparation)

| Example | | 8 | 9 | 10 | 11 |
|---|---|---|---|---|---|
| Deionized water | (%) | 70.1 | 71.4 | 70.4 | 73.2 |
| Polyethylene glycol (molecular weight 400 g/mol) | (%) | 4 | 4 | 4 | 4 |
| 2-Pyrrolidone | (%) | 3.9 | 3.9 | 3.9 | 3.9 |
| Isopropanol | (%) | 1.5 | 1.5 | 1.5 | 1.5 |
| Pigment concentration of Ex. 4 | (%) | 20.3 | | | |
| Pigment concentration of Ex. 5 | (%) | | 19 | | |
| Pigment concentration of Ex. 6 | (%) | | | 20 | |
| Pigment concentration of Ex. 7 | (%) | | | | 17.2 |
| Preservative | (%) | 0.2 | 0.2 | 0.2 | 0.2 |
| pH | | 6.5 | 6.7 | 7.5 | 7.3 |
| Surface tension | (mN/m) | >25 | >25 | >25 | >25 |
| Average particle size (disc centrifuge) | (μm) | <0.2 | <0.2 | <0.2 | <0.2 |

Properties of Pigment Preparations of Examples 8 to 11 Used as Printing Inks

The printing inks of Examples 8 to 11 possess excellent suspension stability after storage at room temperature and 50° C. for a period of 3 months. No flocculation or reaggregation of the pigment particles was observed, and the viscosity of the printing inks is unchanged.

The printing inks were satisfactorily printable on commercially available inkjet printers. They produced bright prints of high colour strength, good contrast and high lightfastness.

The water resistance was tested by preparing prints on a commercially available inkjet printer from Hewlett Packard (HP Deskjet® 1600C) using the black cartridge in the form of a bar chart on normal paper (AGFA 701® from Agfa-Gaevert).

The water resistance was determined by means of a test in which a drop of water was made to run over the print at different time intervals following the preparation of the print and measuring the amount of colorant entrained by the water as a measure of the water resistance.

The prints produced with the printing inks of Examples 8 to 11 all exhibited excellent water resistance. The prints are also fast to highlighters.

We claim:

1. A pigment preparation comprising
   a) 0.1 to 70% by weight of pigment,
   b) 10 to 99% by weight of water, each based on the preparation, and
   c) 0.1 to 100% by weight, based on pigment used as component a), of a water-soluble polyisocyanate addition product, said polyisocyanate addition product having hydrophilic polyether chains and an isocyanate group content of not more than 1.0% by weight, containing 30 to 95% by weight of ethylene oxide units (molecular weight=44 g/mol) arranged within polyether chains and incorporated via monofunctional alcohols B), having an ionic group content of 0 to 200 milliequivalents/100 g of polyisocyanate addition product, and having been prepared by reaction of
   A) a polyisocyanate component of an (average) NCO functionality of 1.7 to 6 and an NCO content of 5 to 65% by weight with at least one of the following components:
   B) 5 to 100 equivalent %, based on the isocyanate groups of A), of a monohydric alcohol component consisting of at least one monohydric polyether alcohol of the molecular weight range 150 to 10,000 glmol with an ethylene oxide unit content of 40 to 99.5% by weight, the polyether alcohol having been prepared by alkoxylation of a monofinctional initiator molecule,
   C) 0 to 20 equivalent %, based on the isocyanate groups of A), of a monofunctional component consisting of at least one compound of the molecular weight range 31 to 5,000 g/mol which has an isocyanate-reactive group and is different from the alcohols of group B),
   D) 0 to 50 equivalent %, based on the isocyanate groups of A), of an amino component consisting of at least one tertiary amine of the molecular weight range 88 to 250 g/mol with a group which is reactive towards isocyanate groups for the purposes of the NCO addition reaction, and
   E) 0 to 20 equivalent %, based on the isocyanate groups of A), of formative components of the molecular weight range 32 to 3,000 g/mol which are at least difunctional for the purposes of the NCO addition reaction, with urethane and optionally urea formation while complying with an NCO number of 100 to 600, any excess NCO groups having reacted in simultaneous or subsequent secondary reactions down to a residual content of not more than 1.0% by weight.

2. The pigment preparation according to claim 1, wherein the polyisocyanate addition product has been prepared with an NCO number of 100 to 130 by reaction of
   A) a polyisocyanate component having an average NCO functionality of 3.0 to 6 and an NCO content of 7 to 30% by weight, based on isocyanurate-functional modification products of 2,4-diisocyanatotoluene or its mixtures with up to 35% by weight, based on the mixture, of 2,6-diisocyanatotoluene, with B) 50 to 90 equivalent %, based on component A), of an alcohol component of the type mentioned under B) in claim 1, C) 0 to 20 equivalent %, based on the isocyanate groups of A), of a monofunctional compound of the molecular weight range 30 to 5,000 g/mol which has isocyanate-reactive groups and additionally contains ionic groups, and D) 10 to 50 equivalent %, based on component A), of an amine component of the type mentioned under D) in claim 1 with urethane formation and optional simultaneous or subsequent (subsequent to the urethane formation) secondary reactions to reduce the level of any excess NCO groups present down to a residual content of not more than 1.0% by weight, the type and mixing ratios of the starting components being chosen so that the reaction product has 40 to 75% by weight of ethylene oxide units incorporated via component B).

3. The pigment preparation according to claim 1, wherein the polyisocyanate addition product of component c) has been prepared with an NCO number of 131 to 600 by reaction of A) a polyisocyanate component having an average NCO functionality of 1.7 to 2.5 and an NCO content of 30 to 65% by weight, consisting of at least one isocyanurate from the following group: 2,4-diisocyanatotoluene, 2,6-diisocyanatotoluene, 4,4'-diisocyanatodiphenylmethane, 2,4'-diisocyanatodiphenylmethane with B) 5 to 50 equivalent %, based on component A), of an alcohol component of the type mentioned under B) in claim 1, C) 0 to 10 equivalent %, based on the isocyanate groups of A), of a monofinctional compound of the molecular weight range 32 to 5,000 g/mol which has isocyanate-reactive groups and additionally contains ionic groups, and D) 0 to 20 equivalent %, based on component A), of an amine component of the type mentioned under D) in claim 1 with urethane formation and optional simultaneous or subsequent (subsequent to the urethane formation) secondary reactions to reduce the level of any excess NCO groups present down to a residual content of not more than 1.0% by weight, the type and mixing ratios of the starting components being chosen so that the reaction product has 40 to 75% by weight of ethylene oxide units incorporated via component B).

4. The pigment preparation according to claim 1, wherein the polyisocyanate addition product of component c) contains 10 to 50 milliequivalents of ionic groups per 100 g of component c).

5. The pigment preparation according to claim 1, comprising a) 1 to 20% by weight of pigment, b) 10 to 98% by weight of water, each based on the pigment preparation, c) 0.1 to 100% by weight, based on pigment used as component a), of the polyisocyanate addition product, and d) at least one organic solvent from the group:
aliphatic $C_1$–$C_4$-alcohols, aliphatic ketones, polyols having an average molecular weight of 100 to 4000 g/mol or glycerol, monohydroxyethers, also 2-pyrrolidone, N-methyl-2-pyrrolidone, N-ethylpyrrolidone, N-vinylpyrrolidone, 1,3-dimethylimidazolidone, dimethylacetamide and also dimethylformamide.

6. The pigment preparation according to claim 1, comprising a) 1 to 10% by weight of pigment, b) 10 to 98% by weight of water, each based on the pigment preparation, c) 0.5 to 60% by weight, based on pigment used as component a), of the polyisocyanate addition product, and d) at least one Qrganic solvent from the group:
methanol, ethanol, isopropanol, n-propanol, n-butanol, isobutanol or tert-butanol, aliphatic ketones, such as acetone, methyl ethyl ketone, methyl isobutyl ketone or diacetone alcohol, ethylene glycol, propylene glycol, butylene glycol, diethylene glycol, triethylene glycol, polyethylene, glycol having an average molecular weight of 400 to 1500, g/mol or glycerol, ethylene glycol monoalkyl, monomethyl, diethylene glycol monomethyl ether or diethylene glycol monoethyl ether, diethylene glycol monobutyl ether, triethylene glycol monomethyl ether or monoethyl ether, also 2-pyrrolidone, N-methyl-2-pyrrolidone, N-ethylpyrrolidone, N-vinylpyrrolidone, 1,3-dimethylimidazolidone, dimethylacetamide and also dimethylformamide.

7. A process for inkjet printing wherein a pigment preparation according to claim 1 is applied.

* * * * *